United States Patent
Munakata et al.

(10) Patent No.: US 6,761,997 B2
(45) Date of Patent: Jul. 13, 2004

(54) POSITIVE ELECTRODE MATERIAL AND BATTERY FOR NONAQUOUS ELECTROLYTE SECONDARY BATTERY

(75) Inventors: Fumio Munakata, Yokohama (JP); Tatsuhiro Fukuzawa, Kanagawa (JP); Yasuhiko Ohsawa, Kanagawa (JP); Yuuji Tanjo, Yokohama (JP); Takuya Mihara, Kanagawa (JP); Takashi Kimura, Kanagawa (JP); Kazuo Sunahara, Kanagawa (JP); Manabu Suhara, Kanagawa (JP)

(73) Assignees: Nissan Motor Co., Ltd., Yokohama (JP); Seimi Chemical Co., Ltd., Chigasaki (JP)

( * ) Notice: Subject to any disclaimer, the term of this patent is extended or adjusted under 35 U.S.C. 154(b) by 234 days.

(21) Appl. No.: 09/791,769

(22) Filed: Feb. 26, 2001

(65) Prior Publication Data

US 2002/0012843 A1 Jan. 31, 2002

(30) Foreign Application Priority Data

Mar. 3, 2000 (JP) .................................. 2000-058104

(51) Int. Cl.[7] .............................................. H01M 4/50
(52) U.S. Cl. .............................. 429/231.1; 429/231.95; 429/219; 429/224
(58) Field of Search ............................... 429/224, 231.8, 429/231.1, 223, 231.5, 231.6, 219

(56) References Cited

U.S. PATENT DOCUMENTS 5,609,975 A * 3/1997 Hasegawa et al. .......... 429/217

6,168,888 B1    1/2001  Iwata et al. ............. 429/231.95
6,368,750 B1 *  4/2002  Nemoto et al. .......... 429/231.95

FOREIGN PATENT DOCUMENTS

| JP | 2870741   | 1/1999  |
| JP | 11-71115  | 3/1999  |
| JP | 11-73962  | 3/1999  |
| JP | 11-171550 | 6/1999  |
| JP | 11-297323 | 10/1999 |

OTHER PUBLICATIONS

A. Robert Armstrong et al., "Synthesis of layered LiMnO$_2$ as an electrode for rechargeable lithium batteries," Nature, vol. 381, Issue No. 6582, Jun. 6, 1996, published by Macmillan Magazines, Ltd.; pp. 499–500.

Publication No. US 2001/0024753A1—Sep. 27, 2001.

Publication No. US 2001/002474A1—Sep. 27, 2001.

Publication No. US 2002/0004170A1–Jan. 10, 2002.

* cited by examiner

Primary Examiner—Randy Gulakowski
Assistant Examiner—Gentle E. Winter
(74) Attorney, Agent, or Firm—Foley & Lardner LLP

(57) ABSTRACT

A positive electrode active material for a nonaqueous electrolyte secondary battery includes at least a lithium-containing manganese layered composite oxide represented by the formula $Li_{1-x}A_xMnO_2$, or the formula $Li_{1-x}A_xMn_{1-y}M_yO_2$. The lithium-containing manganese composite oxide includes a lithium substitute metal A, such as Na, K, Ag, substituting for part of Li. The lithium substitution quantity x may be in the range of $0.03 < x \leq 0.2$.

19 Claims, 1 Drawing Sheet

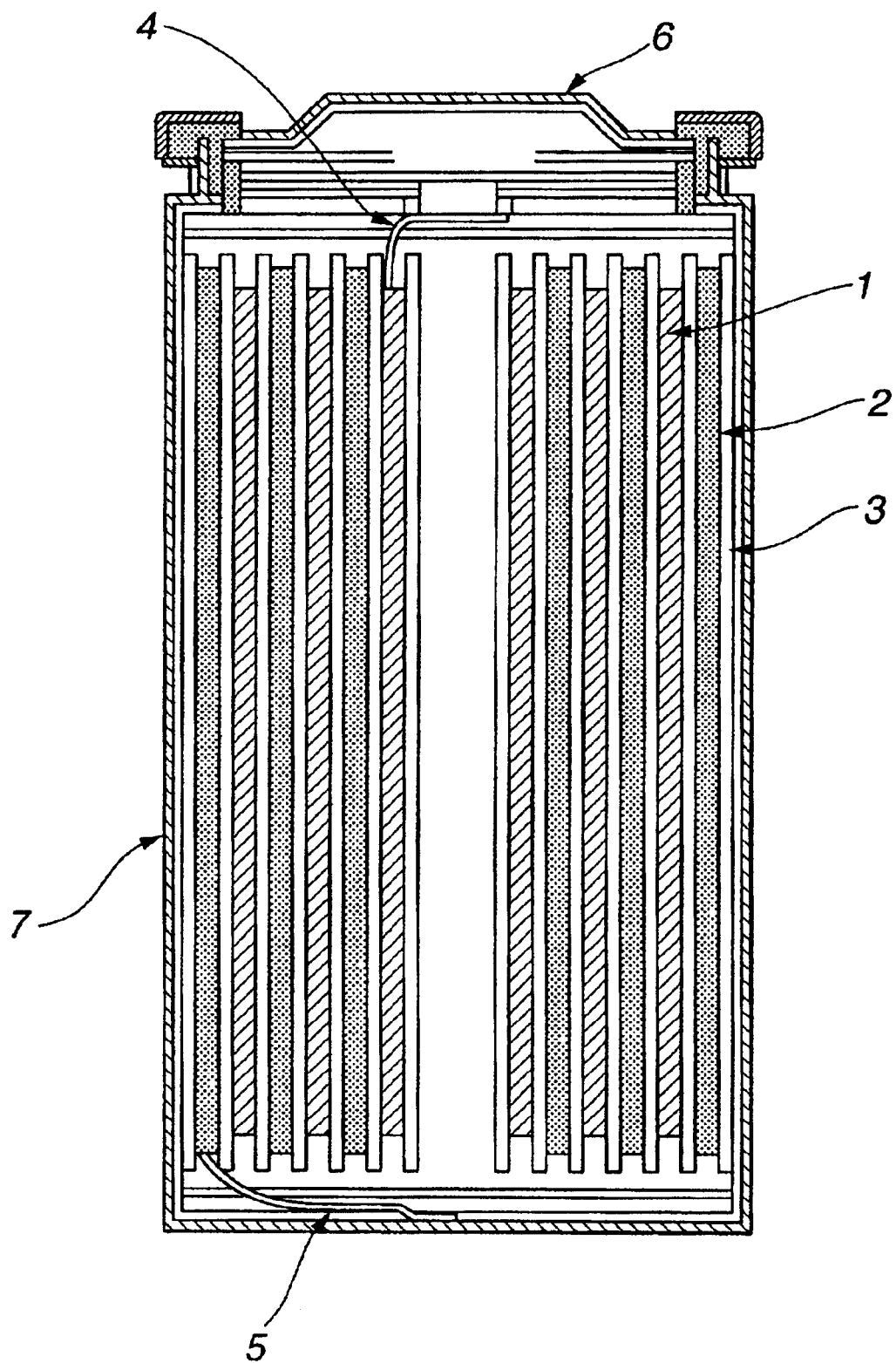

POSITIVE ELECTRODE MATERIAL AND BATTERY FOR NONAQUOUS ELECTROLYTE SECONDARY BATTERY

BACKGROUND OF THE INVENTION

The present invention relates to positive electrode active material and lithium secondary batteries. More specifically, the present invention relates to lithium layered composite oxide advantageous in capacity as compared to a conventional spinel type lithium manganese composite oxide, and in high temperature cycle stability a conventional lithium manganese layered oxide, as positive electrode active material for rechargeable nonaqueous electrolyte secondary batteries, and nonaqueous electrolyte secondary batteries using, as positive electrode active material, such a lithium layered composite oxide.

Among various rechargeable secondary batteries, the lithium secondary battery with its high charge-discharge voltage and large charge-discharge capacity has shown much promise as source of electricity for electric vehicles to meet the recent intense demand for zero-emission vehicles in environmental problem.

In consideration of some aspects of $LiCoO_2$ such as the stability in operating environment, cost and natural reserves of $LiCoO_2$ used as positive electrode active material for a lithium secondary battery, investigation is currently under way on spinel structure lithium manganese composite oxide ($LiMn_2O_4$) as positive electrode active material of a secondary battery for an automotive vehicle. Japanese Published Patent Applications, Publication (Kokai) Nos. 11(1999)-171550 and 11(1999)-73962 show spinel structure lithium manganese composite oxides as positive electrode active material of a secondary battery.

SUMMARY OF THE INVENTION

However, $LiMn_2O_4$ as positive electrode active material is deficient in durability at high temperatures and liable to cause deterioration in performance of the negative electrode due to dissolution of the positive electrode material into the electrolyte. To meet these problems, technique is on trial, of substituting various elements such as transition metals and typical metallic elements, for part of Mn. However, the partial substitution of various element for Mn to improve the high temperature cycle durability as disclosed in Published Japanese Patent Application, Publication (Kokai) No. 11(1999)-71115 is liable to cause distortion in the crystal structure and hence deteriorate the cycle durability at room temperature. Moreover, an increase in the amount of substitution for further improvement of the stability of the crystal structure tends to lower the capacity of the active material.

A lithium manganese composite oxide in an amorphous state by the content of K as disclosed in Japanese Published Patent Applications, Publication (Kokai) Nos. 11(1999)-297323 is liable to cause a decrease in the active material capacity at high temperatures above room temperature.

As to the capacity, lithium cobalt oxides ($LiCO_2$: the active material capacity=140 mAh/g) are higher in capacity than spinel type lithium manganese composite oxides ($LiMn_2O_4$: the active material capacity=100 mAh/g). However, lithium cobalt oxides are disadvantageous in the stability etc., as mentioned before. Therefore, a desired positive electrode active material is a high-capacity Mn containing lithium composite oxide which is higher in the Li content in the crystal structure than the spinel lithium manganese composite oxides ($LiMn_2O_4$) and which is superior in stability in operating environment to the lithium cobalt oxides.

In such a high-capacity type positive electrode active material for a lithium secondary battery, the lithium content in a chemical formula based on the crystal structure is determinative. Japanese Patent 2870741 seeks for a high-capacity Mn containing lithium composite oxide on the basis of crystal-chemical studies.

A recent report (A. Robert Armstrong & P. G. Bruce "Synthesis of layered $LiMnO_2$ as an electrode for rechargeable lithium batteries", Nature, vol.381 (1996) p499) reveals $LiMnO_2$ layered oxide has a positive electrode active material capacity of about 270 mAh/g, more than twice of that of a conventional spinel structure lithium manganese oxide.

With this layered oxide, a sufficient charge-discharge characteristic is obtainable at 55° C., for example. However, the active material capacity decreases to about one third at room temperature. Moreover, the capacity is decreased gradually by repetition of charge and discharge at temperatures over room temperature, so that the cycle durability is insufficient.

It is therefore an object of the present invention to provide a lithium manganese layered composite oxide positive electrode active material which is higher in capacity than the conventional spinel structure lithium manganese composite oxide, and advantageous in high temperature cycle durability as compared to the conventional layered structure lithium manganese composite oxide, and to provide a high-performance lithium secondary battery using this high-capacity lithium manganese layered composite oxide.

According to the present invention, a positive electrode active material for a nonaqueous electrolyte secondary battery comprises: a lithium-containing manganese composite oxide having a layered crystal structure represented by the general formula $LiMeO_2$ where Me is a second constituent comprising Mn. The lithium-containing manganese composite oxide comprising a lithium substitute metal A substituting for a part of Li, and being represented by a chemical formula $Li_{1-x}A_xMeO_2$.

The lithium-containing manganese composite oxide may be represented by the formula $Li_{1-x}A_xMnO_2$ or $Li_{1-x}A_xMn_{1-y}M_yO_2$. The lithium substitute metal A may comprise at least one selected from the group consisting of alkali elements and Ag, and a lithium substitution quantity x of the lithium substitute metal A may be in the range of $0.03 \leq x \leq 0.2$. The lithium-containing manganese composite oxide may further comprise a manganese substitute metal M substituting for a part of Mn.

BRIEF DESCRIPTION OF THE DRAWINGS

FIGURE is a view showing a nonaqueous secondary battery according to one embodiment of the present invention.

DETAILED DESCRIPTION OF THE INVENTION

In conventional spinel structure lithium manganese composite oxides and layered structure lithium manganese composite oxides, considerable crystal lattice distortion is involved due to Jahn-Teller ions of $Mn^{+3}$, the valence of Mn varies from +3 to +4 by charge and discharge operations of Li, the volume of the crystal lattice changes repeatedly, and hence the characteristic degrades to less durability. One possible way for increasing the stability of the crystal structure is to introduce an element capable of serving as support for the crystal lattice and thereby to prevent distortion in the crystal lattice during intercalation and deintercalation of lithium. From such a viewpoint, strong endeavor has been made by the inventors of this application to seek a new composite oxide.

Attention has been paid to the conventional NaCl type MO crystal and the layered structure $LiMO_2$ composite oxide which are thought to be very similar in crystal-chemical structure, and the inventors of this application has conceived that the layered structure $LiMO_2$ composite oxide is repetition of MO crystal block. The view reached from this notion is that the layered $LiMO_2$ composite oxide has a structure of regular repetition of [LiO][MO] block in which the MO blocks [MO] and LiO blocks [LiO] are arranged alternately.

By applying this view of the block structure, the crystal structure of known sodium manganese oxide $Na_{2/3}MnO_2$ is expressed as $[Na_{2/3}O][MnO]$. This oxide is considered to have a structure formed by regularly making the Na occupancy in the [NaO] block deficient in the [NaO][MO] block structure. This can be viewed as a structure in which Na is substituted for Li in the layered $LiMO_2$ structure, and moreover one third is removed.

From such a viewpoint, the finding reached by the inventors of this application is that it is possible to create new layered lithium manganese composite oxide having high capacity and superior durability by replacing a part of [LiO] block by [NaO] block. This is achieved not by the amorphous state as in Published Japanese Patent Application Publication (Kokai) No. 11(1999)-297323, but the stabilized state of the crystal structure is achieved by the element serving as a structural support and reinforcing the crystal structure.

Furthermore, the guide for the material design reached by the inventors is that the crystal-chemical difference between Li site and Mn site is small by nature, and by selecting the amount of element substitution properly, it is possible to stabilize the distortion in the crystal and the chemical bond, to improve the cycle stability during charge and discharge and the durability, to restrain reaction with the electrolyte, and thereby to obtain manganese layered composite oxide positive electrode active material having a superior cycle stability.

According to this guide of the regular element substitution, to hold the high temperature cycle stability and durability, the inventors have found novel high-capacity Mn-containing lithium composite oxide positive electrode active materials superior in cycle stability to the conventional layered structure lithium manganese composite oxide by setting the substitution quantity y of regular substitution at Mn sites equal to ½, ⅓, ⅔, ¼, ⅕, ⅖, ⅙, . . . , ⅛, . . . .

A positive electrode active material according to the present invention includes at least: a lithium-containing manganese composite oxide having a layered crystal structure represented by the general formula $LiMeO_2$ where Me is a second constituent including at least Mn. The lithium-containing manganese composite oxide includes at least the lithium substitute metal A which substitutes for a part of Li, and the lithium-containing manganese composite oxide is represented by the chemical formula $Li_{1-x}A_xMeO_2$. Part of lithium is replaced by the lithium substitute metal A.

On the basis of the material design guide of the present invention, the lithium sites, or both of the Li sites and Mn sites are modified by the regular element substitution. The thus-obtained material is the Li site stabilizing regular substitution manganese composite oxide which is superior in cycle stability to a conventional layered structure lithium manganese composite oxide, and high in capacity.

The lithium-containing manganese composite oxide of the present invention can be represented by the formula $Li_{1-x}A_xMeO_2$ ($Li_{1-x}A_xMnO_2$ or $Li_{1-x}A_xMn_{1-y}M_yO_2$).

The lithium substitution quantity x may be greater than or equal to 0.03 and smaller than or equal to 0.2 ($0.03 \leq x \leq 0.2$).

In the general formula $Li_{1-x}A_xMeO_2$ ($Li_{1-x}A_xMnO_2$ or $Li_{1-x}A_xMn_{1-y}M_yO_2$), the lithium substitution quantity x represents an amount of the lithium substitute metal A. The lithium substitution quantity x may be in the range of $0.03 \leq x \leq 0.2$. It is not desirable to decrease the lithium deficiency quantity x below the lower limit of 0.03 because it is difficult to improve the durability with too small an amount of the lithium substitute metal A. On the other hand, an excessive increase of the lithium substitution quantity x beyond 0.2 increases an undesirable tendency to insufficient capacity.

The lithium substitution quantity x may be a rational number a/b (x=a/b) in the range of $0.03 < x \leq 0.2$. The first integer a is selected from natural numbers from 1 to 30 ($1 \leq a \leq 30$), and the second integer b is selected from the natural numbers from 1 to 30 ($1 \leq b \leq 30$), and is greater than the first integer a (a<b). If the integer a and the integer b are smaller than one, then the cycle durability tends to be lower. If the integer a and the integer b are grater than 30, the effects of the lithium substitution tend to become poor, and the cycle durability tends to become insufficient. If the inequality a<b is not satisfied, the crystal structure tends to become unstable, and the cycle durability tends to become lower.

The lithium substitute metal A may includes at least one selected from the group consisting of the alkali elements and Ag.

In the case of $Li_{1-x}A_xMn_{1-y}M_yO_2$, the manganese substitute metal M includes at least transition metal, typical metallic element or other metallic element. The manganese substitute metal M is not Mn and preferably the manganese substitute metal M includes at least one metal selected from the group consisting of transition metals and typical metallic elements. The manganese substitute metal M may include at least one selected from the group consisting of Co, Ni, Cr, Fe, Al, Ga and In.

The manganese substitution quantity y is equal to a rational number in the range greater than zero and smaller than one (0<y<1). The manganese substitution quantity y represents an amount of the manganese substitute metal M at Mn sites. The manganese substitution quantity y may be greater than 0.03 and smaller than or equal to 0.5 ($0.03 < y \leq 0.5$). It is not desirable to decrease the manganese substitution quantity y too much because the improvement in durability tends to be insufficient. On the other hand, an excessive increase of the manganese substitution quantity y increases an undesirable tendency to insufficient capacity.

The manganese substitution quantity y of the substitute metal M at Mn sites may be equal to a ratio (or quotient) c/d (x=c/d). The numerator c is smaller than the denominator d (c<d). Each of the numerator c and the denominator d is a positive integer which is equal to or greater than one and which is equal to or smaller than 30 ($1 \leq c \leq 30$, $1 \leq d \leq 30$). If the integer c and the integer d are smaller than one, then the effects of the metal substitution become poor, and the cycle durability becomes insufficient. If the integer c and the integer d are greater than 30, then the cycle durability tends to become insufficient. The crystal structure tends to become unstable and the cycle durability tends to become lower if the inequality c<d is not satisfied.

The composition variation width of the lithium substitution quantity x may be within ±5%. The effect of the lithium substitution tends to become insufficient if the variation of x is greater than +5% of if the variation of x is smaller than −5%. The composition variation width of the manganese substitution quantity y may be within ±5%. The effect of the substitution tends to become poor, and the cycle durability tends to become insufficient if the variation of y is greater than +5% of if the variation of y is smaller than −5%.

A nonaqueous secondary battery according to the present invention includes at least a negative electrode and a positive electrode including at least such a lithium-containing manganese layered composite oxide. Preferably, the negative electrode includes at least a negative electrode active material capable of retaining and releasing lithium ions, and the positive electrode includes at least a positive electrode active material capable of retaining and releasing lithium ions. An electrolyte may be a lithium ion conductive nonaqueous liquid electrolyte.

As a production process for producing the lithium-deficient manganese composite oxide according to the present invention, it is possible to employ a process including at least a mixing step of mixing manganese compound, lithium compound, and compound of the substitute metal homogeneously at a predetermined molar ratio, and a calcining step of calcining the mixture in the atmosphere of low oxygen concentration.

Examples of the manganese compound which can be used in this process are; electrolytic manganese dioxide, chemically synthesized manganese dioxide, dimanganese trioxide, γ-MnOOH, manganese carbonate, manganese nitrate, and manganese acetate. A desirable range of the average particle diameter of the manganese compound powder is 0.1~100 $\mu$m. Preferably, the average particle diameter is equal to or smaller than 20 $\mu$m. If the grain size is too large, the reaction between the manganese compound and the lithium compound becomes very slow, and the homogeneity of the product material becomes lower.

Examples of the lithium compound are; lithium carbonate, lithium hydroxide, lithium nitrate, lithium oxide, and lithium acetate. Preferable examples are lithium carbonate and lithium hydroxide. Preferably, the average particle diameter is equal to or smaller than 30 $\mu$m.

As a compound of univalent metal, it is possible to use nitrate, acetate, carbonate, hydride and oxide.

Examples of the mixing step are; dry or wet blending of manganese compound, lithium compound and univalent metal (A) compound (and compound of additional metal M); dry or wet blending of manganese-univalent metal complex compound synthesized from manganese compound and univalent metal compound, and lithium compound; dry or wet blending of $LiMnO_2$ (or $Li_{1-x}MnO_2$-δ), univalent metal compound and compound of additional metal M; and dry or wet blending of lithium compound, univalent metal compound and composite product (such as a product of coprecipitation) produced from manganese compound and additional metal compound.

The calcination is carried out in an atmosphere of low oxygen concentration. A preferable atmosphere for the calcination is an oxygen-free atmosphere of gas such as nitrogen, argon or carbon dioxide. Desirably, the oxygen concentration in the atmosphere is equal to or lower than 1000 ppm. More desirably, the oxygen concentration is equal to or lower than 100 ppm.

A desirable calcination temperature is equal to or lower than 1100° C. More desirably, the calcination temperature is equal to or lower than 950° C. Temperatures above 1100° C. tend to incur decomposition of the product material. Desirably, the calcination time is in the range of 1~48 hours. More desirably, the calcination time is in the range of 5~24 hours. The calcination may be a single stage calcination or a multi-stage calcination consisting of two or more calcination steps of different calcination temperatures.

It is possible to efficiently lower the oxygen concentration in the calcination atmosphere by addition, to the mixture of the lithium compound and the manganese compound, of carbon containing compound, preferably carbon powder such as carbon black or acetylene black, or organic substance such as citric acid. The amount of the addition is in the range of 0.05~10%. When the amount of the addition is on the smaller side of this range, the effect is too low. When the amount of the addition is on the greater side, the possibility of byproduct becomes high, and the purity of the target product becomes low because of residue of the additive carbon containing compound.

In the nonaqueous electrolyte secondary battery according to the present invention, it is possible to use, as the material of the negative electrode, any of negative electrode materials for nonaqueous secondary batteries. Examples are; metallic lithium, lithium alloy, metallic oxide such as $SnSiO_3$, metallic nitride such as $LiCoN_2$ and carbon material. Examples of the carbon material are; coke, natural graphite, artificial graphite, and non-graphitizable carbon.

As the electrolytic solution or liquid electrolyte, it is possible to use lithium salt, as electrolyte, dissolved in nonaqueous solvent. Examples of the electrolyte are; $LiClO_4$, $LiAsF_6$, $LiPF_6$, $LiBF_4$, $LiCF_3SO_3$ and $Li(CF_3SO_2)_2N$.

As organic solvent, carbonates, lactones, ethers and others are candidates. Examples are; ethylene carbonate, propylene carbonate, diethyl carbonate, dimethyl carbonate, methyl ethyl carbonate, 1,2-dimethoxy ethane, 1,2-diethoxy ethane, tetrahydrofuran, 1,3-dioxolan, and γ-butyrolactone. It is possible to use any one or more of these solvents alone or in combination. The concentration of the electrolyte dissolved in the solvent can be 0.5~2.0 mole/liter.

Besides these examples, it is possible to use solid or viscous liquid of one or more of the above mentioned electrolytes dispersed homogeneously in high polymer matrix. This solid or viscous liquid may be further impregnated with nonaqueous solvent. As the high polymer matrix, it is possible to employ polyethylene oxide, polypropylene oxide, polyacrylonitrile or polyvinylidene fluoride.

It is possible to provide a separator for preventing short-circuit between the positive and negative electrodes. Examples of the separator are; porous sheet and nonwoven fabric of polyethylene, polypropylene, or cellulose.

PRACTICAL EXAMPLES

In the following practical examples and comparative example, positive and negative electrodes were prepared in the following manner, and encapsulated type nonaqueous solvent battery cells were produced. These practical examples are not exhaustive listings, and the present invention is not limited to these practical examples.

Production of Positive Electrode

Lithium hydroxide monohydrate powder, dimanganese trioxide powder, univalent metal compound, and compound of Mn-site substitute metal were weighed at a predetermined mole ratio, and mixed in a mortar. Thereafter, the mixture was subjected to heat treatment at 900° C. for 24 hours in an atmosphere of argon. After cooling, the calcined product was crushed in a mortar. In this way, positive electrode materials having mole ratios of lithium, manganese, univalent metal and Mn-site substitute metal as listed in Table 1 were obtained.

Production of Cell

Each of the obtained positive electrode materials was mixed with acetylene black as conducting material and PTFE powder as binding material at a weight ratio of 80:16:4. The mixture was molded into a circular disc having a diameter of 12 mm by a pressure of 2 t/cm². The molded mixture was subjected to heat treatment at 150° C. for 16 hours to produce a positive electrode disc. Then, a negative electrode member was formed by compressing lithium metal in the shape of a circular disc having a diameter of 12 mm and mesh-shaped negative electrode collector plate of stainless steel.

As the electrolyte, use was made of a solution of a combined solvent obtained by mixing ethylene carbonate and diethyl carbonate at a volume ratio of 1:1, and $LiPF_6$ dissolved in the combined solvent at a concentration of 1 mole/liter. Polypropylene film was used as a separator.

SUS sheet was used as a collector of the positive electrode. Leads were taken out, respectively, from the positive and negative electrodes, and an element was formed by placing the positive and negative electrode members so as to confront each other across the separator. While being pressed by a spring, this element was interposed between two PTFE plates. Furthermore, the sides of the element were covered by PTFE plates, and a sealed nonaqueous battery cell was completed. The production of the cell was carried out in the atmosphere of argon.

Evaluation

The thus-produced nonaqueous battery cells were examined to evaluate the charge-discharge cycle performance by repetition of charge-discharge cycle at a temperature of 60° C., at a constant current of 0.5 mA/cm² in a voltage range from 4.3V to 2.0V. Table 1 shows the number of charge-discharge cycles reached when the discharge capacity decreases below 90% of the initial discharge capacity.

In the following, each of the practical examples is expressed in terms of the block structure $[Li_{1-x}A_xO][Mn_{1-y}M_yO]$ according to the before-mentioned guiding principle of the present invention.

Practical Example 1

$Li_{0.8}Na_{0.2}MnO_2$ in a row of Table 1 for a first practical example is expressed as $[Li_{4/5}Na_{1/5}O][MnO]$. In the first practical example, $x=1/5$, $y=0$, and $A=Na$ in the general block structure formula $[Li_{1-x}A_xO][Mn_{1-y}M_yO]$.

Practical Example 2

$Li_{0.8}K_{0.2}MnO_2$ in a row of Table 1 for a second practical example is expressed as $[Li_{4/5}K_{1/5}O][MnO]$. In the second practical example, $x=1/5$, $y=0$, and $A=K$ in the general block structure formula $[Li_{1-x}A_xO][Mn_{1-y}M_yO]$.

Practical Example 3

$Li_{0.8}Ag_{0.2}MnO_2$ in a row of Table 1 for a third practical example is expressed as $[Li_{4/5}Ag_{1/5}O][MnO]$. In the third practical example, $x=1/5$, $y=0$, and $A=Ag$ in the general block structure formula $[Li_{1-x}A_xO][Mn_{1-y}M_yO]$.

Practical Example 4

$Li_{0.9}Na_{0.1}MnO_2$ in a row of Table 1 for a fourth practical example is expressed as $[Li_{9/10}Na_{1/10}O][MnO]$. In the fourth practical example, $x=1/10$, $y=0$, and $A=Na$ in the general block structure formula $[Li_{1-x}A_xO][Mn_{1-y}M_yO]$.

Practical Example 5

$Li_{0.9}K_{0.1}MnO_2$ in a row of Table 1 for a fifth practical example is expressed as $[Li_{9/10}K_{1/10}O][MnO]$. In the fifth practical example, $x=1/10$, $y=0$, and $A=K$ in the general block structure formula $[Li_{1-x}A_xO][Mn_{1-y}M_yO]$.

Practical Example 6

$Li_{0.9}Ag_{0.1}MnO_2$ in a row of Table 1 for a sixth practical example is expressed as $[Li_{9/10}Ag_{1/10}O][MnO]$. In the sixth practical example, $x=1/10$, $y=0$, and $A=Ag$ in the general block structure formula $[Li_{1-x}A_xO][Mn_{1-y}M_yO]$.

Practical Example 7

$Li_{0.9}Na_{0.1}Mn_{0.5}Co_{0.5}O_2$ in a row of Table 1 for a seventh practical example is expressed as $[Li_{9/10}Na_{1/10}O][Mn_{1/2}Co_{1/2}O]$. In the seventh practical example, $x=1/10$, $y=1/2$, $A=Na$ and $M=Co$ in the general block structure formula $[Li_{1-x}A_xO][Mn_{1-y}M_yO]$.

Practical Example 8

$Li_{0.9}Na_{0.1}Mn_{0.75}Fe_{0.25}O_2$ in a row of Table 1 for an eighth practical example is expressed as $[Li_{9/10}Na_{1/10}O][Mn_{3/4}Fe_{1/4}O]$. In the eighth practical example, $x=1/10$, $y=1/4$, $A=Na$ and $M=Fe$ in the general block structure formula $[Li_{1-x}A_xO][Mn_{1-y}M_yO]$.

Practical Example 9

$Li_{0.9}Na_{0.1}Mn_{0.75}Ni_{0.25}O_2$ in a row of Table 1 for a ninth practical example is expressed as $[Li_{9/10}Na_{1/10}O][Mn_{3/4}Ni_{1/4}O]$. In the ninth practical example, $x=1/10$, $y=1/4$, $A=Na$ and $M=Ni$ in the general block structure formula $[Li_{1-x}A_xO][Mn_{1-y}M_yO]$.

Practical Example 10

$Li_{0.9}Ag_{0.1}Mn_{0.5}Cr_{0.5}O_2$ in a row of Table 1 for a tenth practical example is expressed as $[Li_{9/10}Ag_{1/10}O][Mn_{1/2}Cr_{1/2}O]$. In the tenth practical example, $x=1/10$, $y=1/2$, $A=Ag$ and $M=Cr$ in the general block structure formula $[Li_{1-x}A_xO][Mn_{1-y}M_yO]$.

Practical Example 11

$Li_{0.9}Na_{0.1}Mn_{0.75}Al_{0.25}O_2$ in a row of Table 1 for a eleventh practical example is expressed as $[Li_{9/10}Na_{1/10}O][Mn_{3/4}Al_{1/4}O]$. In the eleventh practical example, $x=1/10$, $y=1/4$, $A=Na$ and $M=Al$ in the general block structure formula $[Li_{1-x}A_xO][Mn_{1-y}M_yO]$.

Practical Example 12

$Li_{0.9}Na_{0.1}Mn_{0.83}Ga_{0.17}O_2$ in a row of Table 1 for a twelfth practical example is expressed as $[Li_{9/10}Na_{1/10}O][Mn_{5/6}Ga_{1/6}O]$. In the twelfth practical example, $x=1/10$, $y=1/6$, $A=Na$ and $M=Ga$ in the general block structure formula $[Li_{1-x}A_xO][Mn_{1-y}M_yO]$.

Practical Example 13

$Li_{0.9}Na_{0.1}Mn_{0.875}In_{0.125}O_2$ in a row of Table 1 for a thirteenth practical example is expressed as $[Li_{9/10}Na_{1/10}O]$

[$Mn_{7/8}In_{1/8}O$]. In the thirteenth practical example, $x=\frac{1}{10}$, $y=\frac{1}{8}$, A=Na and M=In in the general block structure formula [$Li_{1-x}A_xO$][$Mn_{1-y}M_yO$].

Comparative Example 1

$Li_{1.0}Mn_{1.0}O_2$ in the row of Table 1 for a comparative example 1 is expressed as [LiO][MnO]. In this comparative example, x=0, and y=0 in the general block structure formula [$Li_{1-x}A_xO$][$Mn_{1-y}M_yO$].

TABLE 1

| Samples | Univalent Metal compound | Composition of Positive Electrode Material | Number of Cycles |
|---|---|---|---|
| Practical Example 1 | Sodium Nitrate | $Li_{0.8}Na_{0.2}MnO_2$ | 131 |
| Practical Example 2 | Potassium Nitrate | $Li_{0.8}K_{0.2}MnO_2$ | 106 |
| Practical Example 3 | Silver Nitrate | $Li_{0.8}Ag_{0.2}MnO_2$ | 111 |
| Practical Example 4 | Sodium Hydroxide | $Li_{0.9}Na_{0.1}MnO_2$ | 112 |
| Practical Example 5 | Potassium Hydroxide | $Li_{0.9}K_{0.1}MnO_2$ | 99 |
| Practical Example 6 | Silver Oxide | $Li_{0.9}Ag_{0.1}MnO_2$ | 103 |
| Practical Example 7 | Sodium Hydroxide | $Li_{0.9}Na_{0.1}Mn_{0.5}Co_{0.5}O_2$ | 127 |
| Practical Example 8 | Sodium Hydroxide | $Li_{0.9}Na_{0.1}Mn_{0.75}Fe_{0.25}O_2$ | 123 |
| Practical Example 9 | Sodium Hydroxide | $Li_{0.9}Na_{0.1}Mn_{0.75}Ni_{0.25}O_2$ | 117 |
| Practical Example 10 | Silver Oxide | $Li_{0.9}Ag_{0.1}Mn_{0.5}Cr_{0.5}O_2$ | 121 |
| Practical Example 11 | Sodium Hydroxide | $Li_{0.9}Na_{0.1}Mn_{0.75}Al_{0.25}O_2$ | 115 |
| Practical Example 12 | Sodium Hydroxide | $Li_{0.9}Na_{0.1}Mn_{0.83}Ga_{0.17}O_2$ | 112 |
| Practical Example 13 | Sodium Hydroxide | $Li_{0.9}Na_{0.1}Mn_{0.875}In_{0.125}O_2$ | 116 |
| Comparative Example | — | $LiMnO_2$ | 10 |

The lithium secondary battery cell of each of the first through thirteenth practical examples employs, as positive electrode material, a lithium-containing manganese layered composite oxide represented by the general formula $Li_{1-x}A_xMeO_2$ ($Li_{1-x}A_xMnO_2$ or $Li_{1-x}A_xMn_{1-y}M_yO_2$). In each practical example, A is at least one metal selected from the groups consisting of alkali metals and silver. The lithium substitution quantity x is in the range of $0.03 \leq x \leq 0.2$. In the seventh through thirteenth practical examples, M is not Mn and comprises at least one of transition metal elements and typical metallic elements. The lithium-containing manganese layered composite oxide positive electrode active material of each practical example is significantly improved in cycle performance as compared to the comparative example. The lithium secondary battery cells of these practical examples are especially suitable for batteries for EV and HEV because of the compactness and prolonged lifetime.

FIGURE shows a nonaqueous electrolyte secondary battery employing the positive electrode active material in one of the first through thirteenth practical examples. The nonaqueous electrolyte secondary battery includes a positive electrode 1, a negative electrode 2, a separator 3, a positive electrode lead 4, a negative electrode lead 5, a cover 6 on the positive electrode's side, and a battery casing 7.

This application is based on a basic Japanese Patent Application No. 2000-058104. The entire contents of the basic Japanese Patent Application No. 2000-058104 with a filing date of Mar. 3, 2000 in Japan are hereby incorporated by reference.

Although the invention has been described above by reference to certain embodiments and practical examples of the invention, the invention is not limited to the embodiments and practical examples described above. Modifications and variations of the embodiments and practical examples described above will occur to those skilled in the art in light of the above teachings. The scope of the invention is defined with reference to the following claims.

What is claimed is:

1. A positive electrode active material for a nonaqueous electrolyte secondary battery, the positive electrode active material comprising:

a lithium-containing manganese composite oxide having a layered crystal structure represented by the general formula $LiMeO_2$ where Me is a second constituent comprising Mn, the lithium-containing manganese composite oxide comprising a lithium substitute metal A substituting for a part of Li, and being represented by a chemical formula $Li_{1-x}A_xMeO_2$, the lithium substitute metal A comprising Ag;

wherein a lithium substitution quantity x of the lithium substitute metal A is greater than zero.

2. The positive electrode active material as claimed in claim 1 wherein a lithium substitution quantity x of the lithium substitute metal A is in the range of $0.03 \leq x \leq 0.2$.

3. The positive electrode active material as claimed in claim 2, wherein the lithium substitution quantity x of the lithium substitute metal A is a rational number in the range of $0.03 < x \leq 0.2$.

4. The positive electrode active material as claimed in claim 2, wherein the lithium substitution quantity x is equal to a ratio a/b of a first integer a selected from natural numbers from 1 to 30, to a second integer b which is selected from the natural numbers from 1 to 30 and which is greater than the first integer a.

5. The positive electrode active material as claimed in claim 2 wherein a composition variation of the lithium substitution quantity x is in the range of ±5%.

6. The positive electrode active material as claimed in claim 1, wherein the lithium-containing manganese composite oxide is represented by the formula $Li_{1-x}A_xMnO_2$.

7. The positive electrode active material as claimed in claim 1, wherein the lithium-containing manganese composite oxide comprises a manganese substitute metal M substituting for a part of Mn, and is represented by the formula $Li_{1-x}A_xMn_{1-y}M_yO_2$.

8. The positive electrode active material as claimed in claim 7 wherein the manganese substitution quantity y of the manganese substitute metal M at Mn sites is a rational number in the range of $0<y<1$.

9. The positive electrode active material as claimed in claim 8 wherein the manganese substitution quantity y of the manganese substitute metal M at Mn sites is in the range of $0.03<y \leq 0.5$.

10. The positive electrode active material as claimed in claim 8, wherein the manganese substitution quantity y is equal to a ratio c/d of a numerator c which is an integer selected from the natural numbers from 1 to 30, to a denominator d which is an integer selected from the natural numbers from 1 to 30 and which is greater than the numerator c.

11. The positive electrode active material as claimed in claim 10 wherein a composition variation of the manganese substitution y is in the range of ±5%.

12. The positive electrode active material as claimed in claim 7, wherein the manganese substitute metal M is not Mn and the manganese substitute metal M comprises at least one metal selected from the group consisting of transition metals.

13. The positive electrode active material as claimed in claim 7, wherein the manganese substitute metal M is not Mn and the manganese substitute metal M comprises at least one metal selected from the group consisting of transition metals and typical metallic elements.

14. The positive electrode active material as claimed in claim 7, wherein the manganese substitute metal M comprises at least one selected from the group consisting of Co, Ni, Cr, Fe, Al, Ga, In.

15. The positive electrode active material as claimed in claim 17, wherein the lithium substitution quantity x is greater than 0.03, and smaller than or equal to 0.2; and wherein the manganese substitution quantity y is greater than 0.03, and smaller than or equal to 0.5.

16. A nonaqueous electrolyte secondary battery comprising:

a negative electrode; and a positive electrode comprising a lithium-containing manganese composite oxide having a layered crystal structure represented by the general formula $LiMeO_2$ where Me is a second constituent comprising Mn, the lithium-containing manganese composite oxide comprising a lithium substitute metal A substituting for a part of Li, and being represented by a chemical formula $Li_{1-x}A_xMeO_2$, the lithium substitute metal A comprising Ag;

wherein a lithium substitution quantity x of the lithium substitute metal A is greater than zero.

17. The nonaqueous electrolyte secondary battery as claimed in claim 16, wherein the negative electrode comprises at least one selected from the group consisting of Li metal, composite oxide, nitride and carbon.

18. The nonaqueous secondary battery as claimed in claim 17 wherein the lithium-containing manganese composite oxide is represented by the formula $Li_{1-x}A_xMnO_2$.

19. The nonaqueous secondary battery as claimed in claim 16, wherein the lithium-containing manganese composite oxide comprises a manganese substitute metal M substituting for a part of Mn, and is represented by the formula $Li_{1-x}A_xMn_{1-y}M_yO_2$.

* * * * *